United States Patent Office 2,987,101
Patented June 6, 1961

2,987,101
DIELECTRIC SHEET MATERIAL AND METHOD OF MAKING SAME

William Dean Luker, Starkville, Miss., assignor to E. I. du Pont de Nemours and Company, Wilmington, Del., a corporation of Delaware
No Drawing. Filed Feb. 3, 1960, Ser. No. 6,363
14 Claims. (Cl. 154—2.6)

This invention relates to a novel method of making dielectric sheet material, and to new and improved products made by this method.

In certain preferred embodiments, the invention is directed towards the manufacture of dielectric sheet material of such thinness and toughness that it is useful as slot liners in automatically wound electric motors. In particularly preferred embodiments, the invention is directed towards the manufacture of a slot liner material which, because of its unique combination of electrical, mechanical and chemical properties, has outstanding utility in automatically wound motors for operation within closed refrigeration units of the type now used extensively in home and commercial refrigerators.

Cellulosic sheet materials have been widely used for many years as electrical insulation material. But in some applications, cellulosic dielectric sheets have serious shortcomings. It is known, for example, that when cellulosic (e.g. rag paper) slot liners are used in the motor of a hermetic compressor in the operation of a refrigeration system employing a halogenated aliphatic hydrocarbon refrigerant and a refined petroleum oil lubricant, mechanical failure of the system often occurs within a relatively short period of time. It is believed that cellulose breaks down by reaction with the refrigerant under operating temperatures and conditions, resulting in the liberation of corrosion-inducing vapors (e.g., moisture) and a gummy substance which tends to cause clogging of the system's capillary tubes. The liberated vapors are believed to catalyze the degradation of refrigerant and thereby to accelerate the formation of harmful deposits on such key steel mechanical parts as valves, pistons and bearings, leading to early failure of the system. A more detailed description of the well known tendency towards formation of such deposits in modern hermetic refrigeration systems, often referred to as "copper plating" when the deposits are copper-like in appearance, is given in copending patent application S. N. 545,761 filed November 8, 1955, by B. J. Eiseman, now U.S. Patent No. 2,943,057.

The presence of mere traces of foreign matter in a hermetic refrigeraton unit has been known to catalyze the degradation of the refrigerant and/or to result in harmful deposits in the unit's fine capillaries.

Accordingly, the refrigeration industry has long been seeking an improved dielectric sheet material for use as slot liners and other insulation parts in refrigerator motors. Numerous materials have been tried, including sheets made from synthetic polymer compositions, synthetic fiber papers, and plastic treated webs, but few have had the desired degree of resistance to chemical breakdown under operating conditions. And the few materials which were sufficiently inert chemically were not fully satisfactory with respect to toughness and/or dielectric strength.

When the coils of a motor are wound on automatic equipment, the slot liners are subjected to such impact and abuse that, unless they are made from a very tough material, they are split and otherwise damaged. Slot liners previously made from papers and non-woven fabrics, whether resin treated or not, have been particularly vulnerable to splitting during automatic winding. Until the present invention the industry has lacked a slot liner material which is not only chemically harmless to the refrigeration system and of good dielectric strength, but also tough enough to withstand the automatic winding operation.

It is therefore a primary and specific object of this invention to provide a slot liner material adapted for use in refrigerator motors which material has an improved balance of properties including dielectric strength, toughness and chemical inertness in a closed refrigeration system as described above.

A further object is the provision of a sheet material which is useful as electrical insulation in general, and as slot liners in automatically wound motors in particular.

Another object is the provision of a method of manufacturing such dielectric sheet materials.

Other objects will be apparent from the description of the invention which follows.

It has been discovered that the objects of this invention can be accomplished by a process which, in broad terms, comprises forming and then consolidating under heat and pressure an assembly of stacked waterleaf layers having the arrangement and composition as described below. The assembly of waterleaf layers is also referred to as a "composite waterleaf."

The composite waterleaf comprises the following 3 layers:

(1) An intermediate layer consisting essentially of neoprene fibrids and textile fibers in thoroughly blended and intimately interlaced relationship, (2) An outer layer on one side of said intermediate layer comprising fibrids of an interpolymer of a monomer mixture containing (A) acrylonitrile, (B) at least one alpha-olefinic carboxylic acid of the group consisting of acrylic, methacrylic, ethacrylic, phenyl acrylic, crotonic, itaconic, glutaconic and maleic, and (C) at least one alkanol ester of said acid, the weight ratio of $A:C$ being about from 20:80 to 85:15, and the weight of B being about 1.5% to 15% of the total weight of said monomer mixture, and (3) An outer layer on the other side of said intermediate layer comprising fibrids of the interpolymer described above under layer (2).

Consolidation of the composite waterleaf into the end product is performed by pressing it between opposing pressure elements while at an elevated temperature sufficient to cause the fibrids therein to weld to one another but not high enough to cause degradation of the fibrids or to cause the textile fibers therein to weld to one another. When consolidation is completed, the product is cooled.

The fibrids within each layer of the consolidated product are welded together into a substantially continuous polymeric phase and the neoprene layer is cured. In the layer or layers containing textile fibers, the fibers are in a thorough and random state of dispersion throughout the continuous fibrid-derived mass or matrix of polymer. The fibrids and fibers of the layers' contiguous surfaces are permanently entangled and compacted during consolidation into a dense interlaced mass of fibrous particles, thereby forming a thin bonding layer between adjacent layers of the product, and thereby permanently and integrally uniting the layers together.

The term "waterleaf" is used herein in its normal sense; that is, it designates a paper-like structure of intimately entangled or interlaced fibrous particles obtained by depositing the particles from a slurry (aqueous suspension) onto a porous membrane such as a screen or felt.

"Fibrids" are wholly synthetic polymeric particles capable of forming a waterleaf having a couched wet tenacity of at least 0.002 gram per denier and a dry tenacity of at least this much when dried at less than 50° C. Fibrids have at least one dimension of minor magnitude relative to their largest dimension. They are generally retained to the extent of not over 10% on a 10 mesh screen and at least 90% on a 200 mesh screen when classified by the Clark classification test (Tappi 33, 294–8, No. 6, June 1950). They have a Canadian freeness number between 90 and 790, and retain at least 2.0 grams of water per gram of particles under a compression load of about 39 grams per square centimeter. When deposited concomitantly with staple fibers they are able to bond at least their own weight of the fibers by physical entwinement therewith to give a composite waterleaf having a wet tenacity of at least 0.002 gram per denier.

Fibrids, their characteristics, preparation and uses are disclosed in U.S. applications S.N. 788,370, filed January 22, 1958, by E. Campbell et al. and S.N. 635,876, filed January 23, 1957, by P. W. Morgan, now abandoned; also in Belgian Patent 564,206, granted July 23, 1958.

Fibrids for use in the present invention are preferably formed by gradually introducing a solution of the polymer (neoprene or acrylic interpolymer) into a precipitant comprising a liquid non-solvent for the polymer under conditions of shear precipitation.

The composition from which the neoprene fibrids are formed for use in the intermediate layer of the composite waterleaf is compounded in accordance with known methods from chloroprene, curative, and modifiers as desired, to have the desired electrical properties, curing rate, toughness and resistance to the environment in which the product will be used.

The precipitant in which the neoprene fibrids are formed is preferably cooled substantially below room temperature so that the fibrids will not be excessively tacky. Also, the precipitant should contain a finely divided solid material adapted further to prevent agglomeration of the fibrids, such as asbestos or talc.

The fibrids in the outer layers of the composite waterleaf are made from an acrylic interpolymer which is at least ternary in composition, and which is the polymeric reaction product of a mixture of monomers comprising (A) acrylonitrile, (B) an alpha-olefinic carboxylic acid of the group previously listed, and (C) an alkanol ester of said acid. The alkanol should be a saturated aliphatic monohydric alcohol having 1 to 12 carbon atoms. The weight ratio of $(A):(C)$ should be about from 20:80 to 85:15, and the weight of (B) should equal about 1.5 to 15% of the weight of said mixture of monomers. Thus, $(A)+(C)$ should constitute 85% to 98.5% of the weight of the monomer mixture. When the acrylonitrile content is near the maximum, it is preferable to use an 8 to 12 carbon atom alkyl group on the ester. The terpolymer of acrylonitrile, butyl acrylate and methacrylic acid in the weight ratio of about 35:60:5 respectively, produced in accordance with the teaching of U.S. Patent 2,787,603, is preferred when making slot liners for refrigerator motors because of its excellent resistance to the refrigerant/oil mixtures employed in such motors.

Additives can be blended with the precipitant, the polymer solution and/or the fibrid slurry employed in forming any of the waterleaf layers, such as substances which will desirably modify the characteristics of the slurry or of the product. Textile fibers in the form of "staple" fiber represent a preferred type of additive for the slurry. By "staple" fiber is meant fibers cut fairly uniformly to a definite length corresponding to that of natural textile fiber, such as cotton or wool.

Any one or more of various synthetic or natural staple fibers can be used, including for example, fibers of polyacrylonitrile and acrylonitrile copolymers, polyesters such as poly(ethylene terephthalate) and poly(hexahydro-p-xylylene terephthalate), polyamides such as poly(hexamethylene adipamide) and polycaproamide, polytetrafluoroethylene, rayon, cellulose acetate, glass and cotton. Synthetic organic staple fibers are preferred. Polyacrylonitrile fibers, that is, fibers of the homopolymer of acrylonitrile or of a copolymer containing a predominant amount of acrylonitrile polymerized therein (e.g., a copolymer of at least 80% acrylonitrile and a vinyl pyridine or an alkyl acrylate), are especially preferred when the product is to be used in a closed refrigeration system in the presence of a halogenated aliphatic hydrocarbon refrigerant such as a chloroalkane, a chlorofluoroalkane or a bromofluoroalkane. Polyacrylonitrile fibers are not only highly resistant to attack in such a system, but also actually tend to prevent the formation of harmful deposits therein, especially the copper-like deposits referred to previously. Poly(ethylene terephthalate) fibers are especially preferred when a product of maximum toughness and heat resistance is desired.

The fusion temperature of the textile fibers should be high enough that they do not become tacky and welded together at the temperature used for welding the fibrids and consolidating the waterleaf.

Any size of textile fibers can be used which will disperse with the fibrids into a waterleaf-forming slurry in the desired proportions, and which will contribute the desired toughness to the product. Fibers about ¼ to ½ inch long usually provide the best balance between ease of dispersion and product toughness. When using a maximum amount of ½ inch fibers, or when using fibers ½ to 1 inch, or even up to 2 inches, in length, dispersion thereof is facilitated by employing the foam dispersion technique disclosed in copending U.S. application S.N. 726,186, filed April 3, 1958, by F. S. Wilcox.

The best amount and type of textile fibers to be used in any of the layers will be governed by such factors as the conditions under which the slurry is to be formed and filtered, fiber length, and the properties to be attained in the product, such as toughness and chemical inertness. Skilled chemists in the art, when aided by the present disclosure, will have little difficulty in selecting staple fiber of suitable size and type, and using it in the proportions that will best serve a particular purpose.

With respect to the preparation of the neoprene fibrid or intermediate layer, it is generally advisable to use a slurry in which the neoprene fibrid:textile fiber weight ratio is about from 35:65 to 65:35, and in most cases the best ratio will be within the range of about 45:55 to 55:45.

When making the slurry from which the two interpolymer fibrid or outer layers are formed, it is not always preferred or necessary to add textile fibers. But when the layers are to be formed continuously on a paper making machine, fibers are preferably added to enhance waterleaf deposition characteristics. For most purposes, the preferred interpolymer fibrid:fiber weight ratio is from about 95:5 to about 85:15; however, in some applications a considerably higher fiber content is useful. For example, as much as 65% or more fiber based on the combined weight of fibers and fibrids is sometimes useful.

Each layer of the composite waterleaf can be formed and dried separately, and the individual layers then stacked in proper order for consolidation. Or one layer can be deposited directly onto another layer while wet, and the superposed layers removed from the screen and dried as a unit. Between the essential inner and outer layers there can be a layer comprising a blend of neoprene fibrids and the acrylic interpolymer fibrids, with or without admixed textile fibers.

When making a refrigerator motor slot liner material in the usual thickness of about 10 to 20 mils after consolidation, it is preferred that the essential intermediate layer constitute about 20% to 40% of the weight of the product. This layer contributes substantially to the surprising toughness of the product in terms of resistance to damage in automatic motor winding operations. The outer layers, on the other hand, contribute substantially to the excellent dielectric and refrigerant resistance properties of the product.

Consolidation of the composite waterleaf comprises the act of pressing it into a compact integrally-bonded shaped body or sheet. The opposing pressure elements employed can be the heated platens of a laminating press, the male and female halves of a mold, or heated rollers. Cold pressure elements are useful when the waterleaf is heated prior to pressing so that the fibrids are at a suitable welding temperature. The heating cycle during or after pressing should be sufficient to cure the neoprene in the consolidated intermediate layer. Under the influence of heat and pressure the fibrids are inseparably bonded, fused or "welded" together to form a substantially continuous polymeric phase of the composition from which the fibrids were made. The thoroughly dispersed and random disposition of the textile fibers embedded within the cured neoprene layer is an important factor in the toughness of the product.

The method of the present invention has the advantage of being adapted for economical mass production techniques. For instance, the composite waterleaf can be formed continuously, layer on layer, on a Fourdrinier paper making machine, continuously dried in a heat zone, and the dried preheated waterleaf can be consolidated continuously in the nip formed by calender rolls or by the drum and tension band of a rotary curing apparatus of the type described in U.S. Patent 2,039,271. The method is equally adapted for small-scale or special runs on such common laboratory apparatus as papermakers' sheet molds and small hydraulic presses.

All of the products of this invention are useful as electrical insulation and are characterized by an advantageous balance of properties including high dielectric strength, toughness and chemical inertness. When manufactured in a certain thickness range, usually about 10 to 20 mils, the products are particularly useful as slot liners in automatically wound electric motors. This is because of their surprising resistance to splitting in the winding operation, combined with the other desirable properties mentioned immediately above. When the products in the slot liner thickness range containing acrylic staple fiber and the more solvent resistant grades of the acrylic interpolymer, they are exceptionally useful as slot liners for refrigerator motors because they are not only resistant to degradation themselves during operation of the refrigeration unit, but also prevent or appreciably delay failure of the unit resulting from the formation of copper-like deposits on the internal steel parts believed to be caused by corrosion of copper parts by corrosives liberated from the degradation of the unit's refrigerant and/or lubricating oil.

The following examples are intended to illustrate the invention. All quantities are on a weight basis unless otherwise indicated.

*Example 1*

This example illustrates the production of a dielectric sheet material for use as slot liners in the motor of a closed refrigeration system employing dichlorodifluoromethane as the refrigerant.

A quantity of an aqueous dispersion of a terpolymer of 35 parts acrylonitrile, 60 parts butyl acrylate and 5 parts methacrylic acid, prepared in accordance with the teaching in U.S. Patent 2,787,603, is tray dried in an oven. When substantially free of moisture, the terpolymer is dissolved in enough dimethyl formamide to form a 7% solution.

Fibrids of the terpolymer are made by slowly introducing one part of the 7% solution as a fine stream into 12 parts of water at 70° F. while the water is vigorously agitated. Upon entering the turbulent water, the terpolymer is precipitated from the solution in the form of fibrids. By means of a 100-mesh screen, the fibrids are filtered from the mixture of water and dimethyl formamide. While still on the screen, the fibrids are washed with water. A slurry of the terpolymer fibrids is prepared by dispersing 0.2 part of the washed fibrids in 100 parts of water.

Separately, a textile fiber slurry is prepared by thoroughly dispersing 0.2 part of ¼ inch, 2 denier polyacrylonitrile staple fibers in 100 parts of water.

Eight parts of the staple fiber slurry and 92 parts of the terpolymer fibrid slurry are uniformly blended to form a slurry in which the fiber:fibrid weight ratio is 8:92. The blended slurry is filtered on a 100 mesh screen in a papermakers' sheet mold with the aid of vacuum, using enough of the slurry to deposit about 3.8 ounces per square yard of the fiber/fibrid mixture (dry weight basis) on the screen. The resulting vacuum-drained sheet is removed from the screen and dried on a paper drier heated to about 250° F. Microscopic examination reveals that the staple fibers in the dried sheet are thoroughly and randomly dispersed amongst the mass of interlaced terpolymer fibrids.

A second sheet exactly like the one just described is prepared in the same manner.

A sheet comprising neoprene fibrids and the same staple fibers is prepared by first blending the following neoprene composition on a rubber mill:

| | Parts by weight |
|---|---|
| Neoprene | 200 |
| Magnesium oxide | 4 |
| Zinc oxide | 10 |
| Phenyl-beta-naphthylamine | 4 |
| 2-mercaptoimidazoline | 1 |
| | 219 |

The milled neoprene composition is dissolved in enough tetrahydrofurane to form a 10% solution. Neoprene fibrids are made by slowly introducing 100 parts of the solution as a fine stream into a chilled precipitant while the latter is vigorously agitated. The precipitant consists of 1200 parts of water at 40° F., 50 parts of crushed ice, and 10 parts of fine asbestos dispersed therein. Upon entering the turbulent chilled precipitant, the neoprene is precipitated from the solution in the form of fibrids, which in turn are filtered and washed in the same manner as were the terpolymer fibrids.

A slurry of the neoprene fibrids is prepared by dispersing 0.2 part of the washed fibrids in 100 parts of water. Fifty parts of the above-described polyacrylonitrile fiber slurry and 50 parts of neoprene fibrid slurry are uniformly blended to form a slurry in which the fiber:fibrid weight ratio is 50:50. The blended slurry is filtered on a 100 mesh screen with the aid of vacuum, using enough of the slurry to deposit about 2.8 ounces per square yard of the fiber/fibrid mixture (dry weight basis) on the screen. The resulting vacuum-drained sheet is removed from the screen and dried on a paper drier. The staple fibers in the dried sheet are in a thorough and random state of dispersion amongst the mass of interlaced neoprene fibrids.

The resultant dried fibrous sheet comprising neoprene fibrids is interposed between the two previously prepared fibrous sheets comprising acrylic terpolymer fibrids. This sandwiched assembly or composite waterleaf is interposed between two thin release sheets of polytetrafluoroethylene coated glass fabric in a hydraulic press and pressed for 10 minutes under a pressure of 250 pounds per square inch while both platens of the press are at about 350° F. The pressure is continued while the platens and the consolidated sheet are cooled to room temperature, after which the sheet is removed from the press and from between the release sheets.

In the consolidated sheet, now a refrigerator motor slot liner material, the fibrids within each of the three layers are welded together, forming a substantially continuous polymeric phase throughout which the polyacrylonitrile fibers are embedded in a thorough and random state of dispersion. Between the inner layer and each of the outer layers is a thin dense mass of intimately interlaced fibers and fibrids which integrally unites the layers.

The product of this example has a thickness of 13.5 mils, a weight of 10.4 ounces per square yard, and a dielectric strength of 850 volts per mil of thickness (ASTM Method D–149–55T, using ¼" electrode, 60 cycle current). When used as slot liners in a refrigerator motor, the product is not split or otherwise damaged in automatic motor winding operations. When the motor is used to operate a closed refrigeration system in which the refrigerant is dichlorodifluoromethane, the system gives trouble-free service for an extended period of time.

*Example 2*

A dielectric sheet material having properties and utility similar to the product of Example 1 is produced by repeating Example 1 except for the following two differences:

(a) The outer layers are formed from the slurry of washed terpolymer fibrids; no fibers are added. As a result, the outer layers of the product consist entirely of the terpolymer, and thus do not contain fibers as they did in Example 1.

(b) In preparing the composite waterleaf, the blended slurry of neoprene fibrids and fibers is filtered in the manner of Example 1, but before the resulting wet sheet is removed from the screen, one of the outer layers is deposited directly thereon from the terpolymer fibrid slurry. The two-layer waterleaf which results is turned over in the sheet mold and the other outer layer is deposited directly thereon. The resultant three-layer composite waterleaf is dried and then consolidated in the manner of Example 1.

*Example 3*

A dielectric sheet material for use as slot liners in an automatically wound electric water-pump motor is produced by repeating Example 1 except for the following two differences:

(a) The polyacrylonitrile fibers in both fibrid slurries are replaced with ¼ inch, 3 denier poly(ethylene terephthalate) staple fibers.

(b) Thirty parts of the fiber slurry and 70 parts of the acrylic terpolymer fibrid slurry are blended to form a slurry for both of the outer layers in which the fiber:fibrid weight ratio is 30:70.

*Example 4*

A dielectric sheet material having properties and utility similar to the product of Example 1 is produced in the same manner as Example 1 except the two outer layers are prepared as follows: First, a terpolymer of acrylonitrile, butyl acrylate and methacrylic acid in the weight ratio of 63:32:5 is dissolved in sufficient dimethyl formamide to form a 10% solution.

Next, fibrids of the terpolymer are made by pouring 30 grams of the 10% solution as a thin even stream into 400 ml. of glycerine during a 2 minute pouring period while the glycerine is stirred in a one-quart Waring Blendor at 12,330 revolutions per minute. After the fibrids are washed with water, 90 parts thereof are blended in water with 10 parts of ¼ inch, 2.5 denier staple fibers of a copolymer of acrylonitrile and methyl acrylate in the weight ratio of 94:6, forming a slurry containing 0.05% solids. This furnish is poured into the headbox of an 8" x 8" sheet mold in sufficient amount to deposit a weight corresponding to about 4.0 ounces per square yard of the fiber/fibrid solids on the 100 mesh screen. Vacuum is applied to the reservoir of the sheet mold before the gate valve releasing the water from the headbox is opened. When the gate is opened, the waterleaf is deposited rapidly on the screen. When vacuum-drained, the sheet is removed from the screen and dried on a heated paper drier. A second sheet is made in the same manner.

The product of this example has extraordinary capacity to inhibit and prevent the formation of harmful deposits on the mechanical parts within a closed refrigeration in which is present a mixture comprising a halogenated aliphatic hydrocarbon refrigerant and a hydrocarbon lubricating oil such as a refined petroleum oil.

*Example 5*

A dielectric sheet material having properties and utility similar to the product of Example 3 is produced by repeating Example 3 except for the substitution of the following acrylic terpolymer for the one used therein: a terpolymer of acrylonitrile, 2-ethyl hexyl acrylate and methacrylic acid in the weight ratio of 35:60:5.

The product, which is useful as slot liners in automatically wound motors not intended for use in closed refrigerator units, is slightly more flexible and heat resistant than the product of Example 3.

It is clear that obvious variations and modifications of this invention can be made without departing from its spirit and scope as defined in the appended claims.

I claim:

1. A method of making dielectric sheet material which comprises the steps of (1) preparing a dried composite waterleaf comprising an intermediate layer consisting essentially of fibrids of a curable neoprene composition and textile fibers in thoroughly blended and interlaced relationship and two layers constituting the outer layers of said waterleaf comprising fibrids of an acrylic interpolymer of a monomer mixture containing (A) acrylonitrile, (B) at least one alpha-olefinic carboxylic acid of the group consisting of acrylic, methacrylic, ethacrylic, phenyl acrylic, crotonic, itaconic, glutaconic and maleic, and (C) at least one alkanol ester of said acid, the weight ratio of $A:C$ being about from 20:80 to 85:15, and the weight of B being about 1.5–15% of the weight of said monomer mixture, (2) pressing said composite waterleaf at a temperature below the fusion temperature of said textile fibers but high enough to cause the fibrids within each of said layers to become welded into a dense substantially continuous polymeric phase, said neoprene composition to be cured, and a bonding layer comprised of a dense entangled mass of said fibrids and fibers to be formed between and integral with each outer layer and said intermediate layer, and (3) thereafter cooling the resultant consolidated composite sheet.

2. A method as defined in claim 1 wherein said acrylic interpolymer is a terpolymer of acrylonitrile, methacrylic acid and butyl acrylate in the respective weight ratio of about 35:5:60.

3. A method as defined in claim 2 wherein said textile fibers are polyacrylonitrile fibers.

4. A method as defined in claim 2 wherein said textile fibers are poly(ethylene terephthalate) fibers.

5. A method as defined in claim 3 wherein the polyacrylonitrile fiber:neoprene fibrid weight ratio is about from 35:65 to 65:35.

6. A method as defined in claim 5 wherein the ratio of the weight of the intermediate layer to the combined weight of the two outer layers is about from 20:80 to 40:60.

7. A method of making a dielectric sheet material adapted for use as slot liners in automatically wound motors for hermetic refrigeration units which method comprises the steps of (1) preparing a dried composite waterleaf consisting essentially of an intermediate layer composed of fibrids of a curable neoprene composition and polyacrylonitrile fibers in which the fiber:fibrid weight ratio is about from 35:65 to 65:35 and an outer layer contiguous with each side of said intermediate layer composed of fibrids of a terpolymer of acrylonitrile, methacrylic acid and butyl acrylate in the weight ratio of about 35:5:60 and up to about 65% polyacrylonitrile fibers based on the total weight of said outer layer, the fibers and fibrids in each of said layers being in thoroughly blended and interlaced relationship with each other, (2) pressing said composite waterleaf while the fibrids therein are at least at their fusion temperature and the textile fibers therein are below their fusion temperature whereby the fibrids within each of said layers are welded into a dense substantially continuous polymeric phase, said neoprene composition is cured, and a bonding layer comprised of a dense entangled mass of said fibrids and fibers is formed between and integral with each outer layer and said intermediate layer, and (3) thereafter cooling the resultant consolidated composite sheet.

8. A dielectric sheet material comprising (1) an intermediate layer which consists essentially of a substantially continuous phase of cured neoprene composition and textile fibers in a thorough and random state of dispersion throughout said layer, (2) an outer layer integrally united to each side of said intermediate layer which comprises a substantially continuous phase of an acrylic interpolymer of a monomer mixture containing (A) acrylonitrile, (B) at least one alpha-olefinic carboxylic acid of the group consisting of acrylic, methacrylic, ethacrylic, phenyl acrylic, crotonic, itaconic, glutaconic and maleic, and (C) at least one alkanol ester of said acid, the weight ratio of $A:C$ being about from 20:80 to 85:15, and the weight of B being about 1.5–15% of the weight of said monomer mixture, and (3) a bonding layer between and integrally united to each outer layer and said intermediate layer consisting essentially of a dense entangled mass of textile fibers, fibrids of said neoprene composition and fibrids of said acrylic interpolymer.

9. A product as defined in claim 8 wherein said acrylic interpolymer is a terpolymer of acrylonitrile, methacrylic acid and butyl acrylate in the respective weight ratio of about 35:5:60.

10. A product as defined in claim 8 wherein said textile fibers are polyacrylonitrile fibers.

11. A product as defined in claim 8 wherein said textile fibers are poly(ethylene terephthalate) fibers.

12. A product as defined in claim 8 wherein the textile fiber:neoprene composition weight ratio in said intermediate layer is about from 35:65 to 65:35.

13. A dielectric sheet material adapted for use as slot liners in automatically wound motors for hermetic refrigeration units consisting essentially of (1) an intermediate layer composed of a substantially continuous phase of cured neoprene composition and polyacrylonitrile fibers in which the fiber:fibrid weight ratio is about from 35:65 to 65:35, (2) an outer layer integrally united to each side of said intermediate layer composed of a substantially continuous phase of a terpolymer of acrylonitrile, methacrylic acid and butyl acrylate in the weight ratio of about 35:5:60 and up to about 65% polyacrylonitrile fibers based on the total weight of said outer layer, the fibers in said layers (1) and (2) being in a thorough and random state of dispersion throughout said layers, and (3) a bonding layer between and integrally united to each outer layer and said intermediate layer consisting essentially of a dense entangled mass of textile fibers, fibrids of said neoprene composition and fibrids of said acrylic interpolymer.

14. A product as defined in claim 13 wherein the ratio of the weight of said intermediate layer to the combined weight of the two outer layers is about from 20:80 to 40:60.

No references cited.